H. D. JAMES.
SYSTEM OF MOTOR CONTROL.
APPLICATION FILED AUG. 2, 1913.
1,175,359.
Patented Mar. 14, 1916.
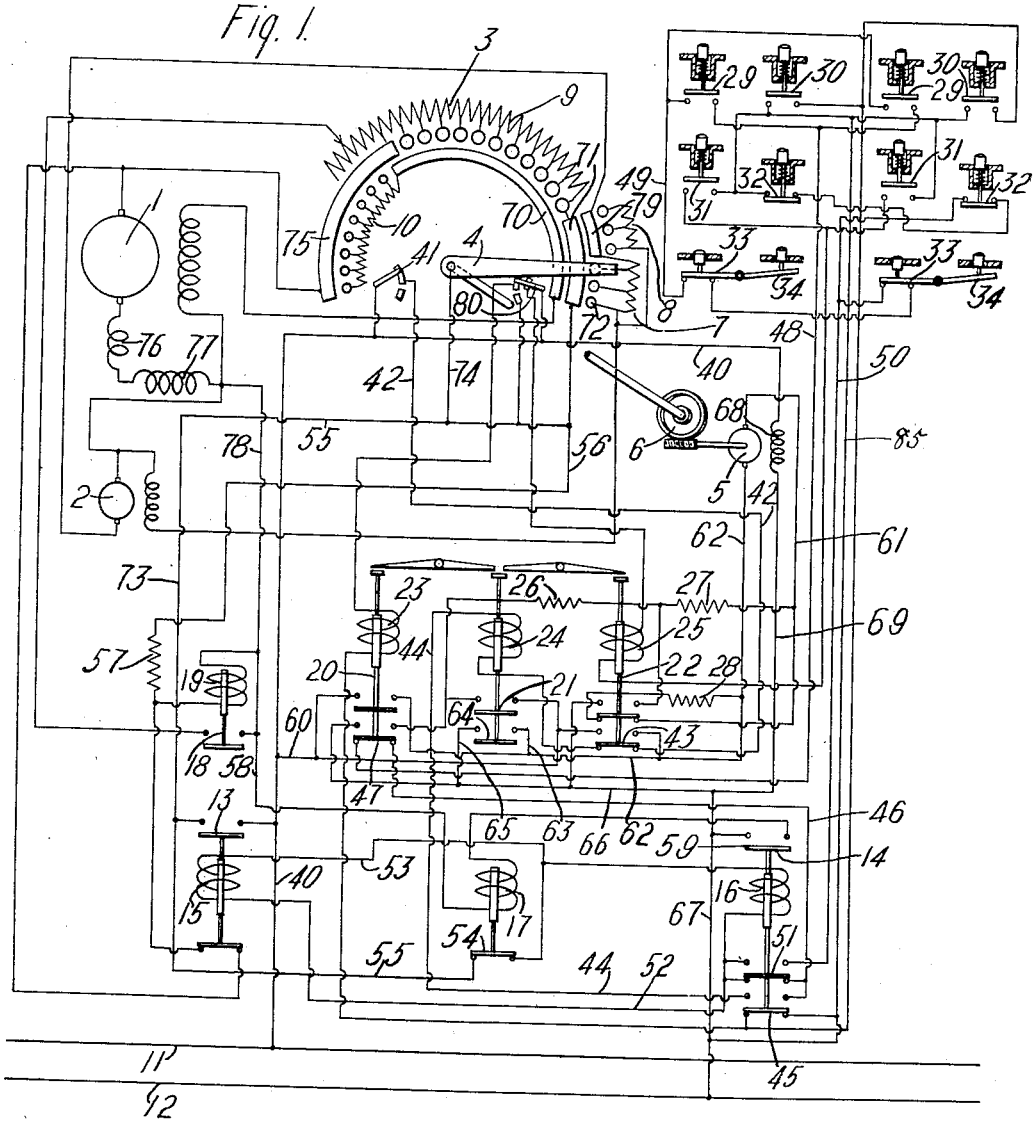
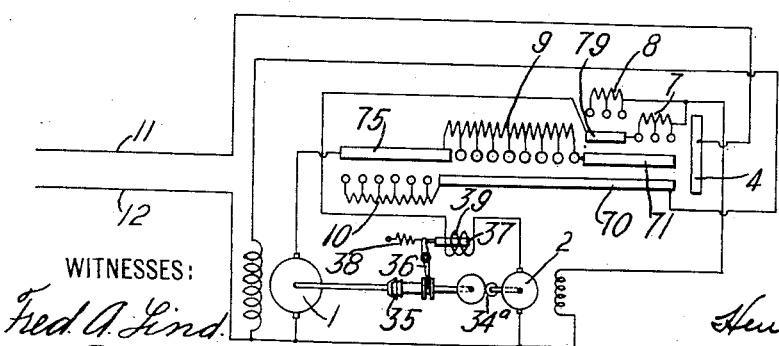
WITNESSES:
Fred A. Lind
J. R. Langley
INVENTOR
Henry D. James
BY Wesley G. Carr
ATTORNEY

UNITED STATES PATENT OFFICE.

HENRY D. JAMES, OF EDGEWOOD, PENNSYLVANIA, ASSIGNOR TO WESTINGHOUSE ELECTRIC AND MANUFACTURING COMPANY, A CORPORATION OF PENNSYLVANIA.

SYSTEM OF MOTOR CONTROL.

1,175,359.

Specification of Letters Patent.

Patented Mar. 14, 1916.

Application filed August 2, 1913. Serial No. 782,562.

*To all whom it may concern:*

Be it known that I, HENRY D. JAMES, a citizen of the United States, and a resident of Edgewood, in the county of Allegheny and State of Pennsylvania, have invented a new and useful Improvement in Systems of Motor Control, of which the following is a specification.

My invention relates to systems of motor control, and it has particular reference to such systems as are employed in the operation of printing presses and machines of a similar character.

My invention has for its object to provide a simple and effective means whereby various kinds of machinery operated by electric power may be driven slowly at a uniform speed.

In the operation of a printing press, it is necessary to start it gradually and without shock to avoid tearing the paper in the rolls and disturbing the adjustment of the various parts. It is desirable to drive the press at a low speed during the preliminary work of making up or preparing for the regular operation and it is also desirable that the drive be at a uniform speed during this period.

According to my present invention, I provide a main motor for driving the machinery during normal operation and an auxiliary motor for controlling the speed of the main motor while the press is being started or driven slowly. The auxiliary motor may be of small capacity and be connected to the machinery through gear mechanism having a large speed reduction. The small motor is so connected as to operate as a motor when the speed of the main motor decreases and to act as a generator when the main motor speeds up.

The details of my invention will be described in connection with the accompanying drawings, in which—

Figure 1 is a diagrammatic view of circuits and apparatus embodying my invention. Fig. 2 is a diagrammatic view of a schematic arrangement of the motor circuits.

Referring particularly to Fig. 1, a main motor 1 and an auxiliary motor 2 are provided with a suitable controller 3. The controller 3 comprises a movable arm 4, the position of which is controlled by a pilot motor 5 through a worm and gear mechanism indicated at 6. The controller also comprises sectional resistors 7 and 8 for controlling the armature and the field circuits, respectively, of the auxiliary motor 2, and resistors 9 and 10 for controlling the corresponding respective circuits of the main motor 1.

The motors are supplied with current from line conductors 11 and 12 through line switches 13 and 14, which are provided with actuating coils 15 and 16 and through an overload relay coil 17. A switch 18, that is provided with a coil 19, controls the dynamic braking circuit of the main motor 1.

The operation of the pilot motor 5 is controlled by switches 20, 21 and 22 having corresponding actuating coils 23, 24 and 25. The switches 20, 21 and 22, which are mechanically and electrically interlocked, control the connections of resistors 26, 27 and 28 to the circuits of the pilot motor 5. The switches 20, 21 and 22 are controlled by duplicate sets of push buttons 29, 30, 31, 32, 33 and 34 which may be located at convenient points upon the printing press or other machine (not shown) to be operated. The actuation of the several push buttons cause the pilot motor to shift the arm 4 to produce the following effects upon the operation of the main motor and the auxiliary motor, when the latter is connected in circuit: 29, start or fast; 30, slow; 31, slow down; 32, stop; 33, run; and 34, safe.

As illustrated in Fig. 2, the shafts of the motors 1 and 2 are so arranged as to be mechanically connected by a reduction gear mechanism 34$^a$ and a friction clutch 35. The clutch is controlled by a lever 36 that is actuated by a magnet core 37 against the force of a spring 38. The magnet core 37 is surrounded by a coil 39 that is in series with the armature of the motor 2 and operates to maintain the clutch connection while the circuit of the motor 2 is closed and to automatically release the clutch when the auxiliary motor circuit is broken.

It may be assumed that the respective motors are stationary and that the arm 4 is in a position corresponding to that shown in Fig. 2. One of the push buttons 29 is closed to complete a circuit which extends from the line conductor 11 through conductor 40, limit switch 80, which is in its lower position, conductors 73 and 55, switch 54, coils 15 and 16 in parallel, switch member 51, conductor 46, switch member 47, conductor 48, switch 29, switches 33, conductor 50, switches 32 and conductor 85 to line conductor 12. The coils 15 and 16 are thus energized to close the line switches 13 and 14. The closing of switch 13 operates to connect the line conductor 11 directly to conductor 55 and thus eliminates a portion of the circuit above traced. The closing of switch 14 causes the switch member 51 to be shifted upwardly and the circuit above traced extends from the switch member 51 through conductor 50, switches 32 and conductor 85 to line conductor 12. The closing of switch 14 also completes a circuit which extends from the conductor 11 through the conductor 40, limit switch 41, conductor 42, switch 43, coil 24, conductor 44, switch 45, conductor 46, swich 47, conductor 48, switch 29, conductor 49, switches 33, conductor 50, switches 32 and conductor 85 to line conductor 12. The coil 24 is thus energized to draw the switch 21 upwardly to complete the circuits of the pilot motor 5. The armature circuit extends from the conductor 11 through conductors 40, 60, switch 21, resistors 26 and 27, conductor 61, pilot motor armature, conductors 62, 63, switch 64, conductors 65, 66, 67 to conductor 12. The field circuit extends from conductor 11 through conductor 40, field winding 68, conductors 69 and 67 to conductor 12. The pilot motor now actuates the arm 4 to complete the circuits of the motors 1 and 2. The arm 4 first engages contact segments 70, 71 and contact pieces 72. The motors 1 and 2 are connected in parallel, having circuits in common from the conductor 11 through conductor 40, line switch 13, conductors 73, 74 to arm 4. The arm 4 is connected through contact segment 71, resistor 9, contact segment 75, armature of motor 1, field windings 76, 77, conductor 78, coil 17, line switch 14 and line conductor 67 to conductor 12. The arm 4 is also connected through contact pieces 72, resistor 7, contact segment 79, magnet coil 39, armature of motor 2 to conductor 78, and thence to the conductor 12, as above traced. The coil 39 is thereby energized to draw the core 37 inwardly to connect the members of the clutch 35. The arm 4 is so adjusted that the proper speed is obtained during the preliminary operations.

The main motor 1 will rotate very slowly because of the high resistance of its armature circuit and will consequently operate at an unstable point in its characteristic curve. The auxiliary motor 2 will run at approximately its normal speed and will, therefore, tend to maintain a uniform speed.

Since the motors are connected in parallel, the motor 2 will act as a motor or as a generator according as the motor 1 decreases or increases the speed of the system. The speed of the system is thus maintained substantially uniform during the preliminary operation of "making up" when the main driving motor is running slowly with a light load and is, therefore, subject to fluctuations in speed.

When the press is ready for normal operation, the pilot motor 5 is operated to actuate the arm 4 to take the running position. The arm 4 operates in succession to gradually cut out the resistor 7 and to insert the resistor 8 in the field circuit of the motor 2. When the arm 4 leaves the contact segment 79, the circuit of the motor 2 is broken and the coil 39 is thereby deënergized to permit the spring 38 to disengage the members of the clutch 35. The arm 4 then gradually cuts out the resistor 9 and, at the end of this operation, inserts sections of the resistor 10 in the shunt field circuit of the motor to weaken the field and thereby increase the speed of the motor. The motor 1 then runs at its normal speed to actuate the press during the regular operation. Further movement of the arm 4 to the left is limited by a limit switch 41 while a limit switch 80 performs the same office at the other end of the range of movement of the arm. It will be understood that the position of the arm 4 and the rate at which it changes or modifies the respective circuits are controlled by the several push buttons through the pilot motor 5, the effect of the actuation of the various buttons being as above noted.

While I have described the details of my invention, it is understood that such changes may be made therein as fall within the limits of the appended claims.

I claim as my invention:

1. The combination with a plurality of motors, of means for operatively connecting the same, means for substantially simultaneously completing the circuits of said motors, and means controlled by the circuit conditions of one of said motors for automatically disconnecting said motors.

2. The combination with a plurality of motors, and means for operatively connecting the same, means for operating one of said motors as a generator when the speed of another motor exceeds a predetermined rate, and means for controlling said connecting means.

3. The combination with a plurality of motors, and automatically controlled means for mechanically connecting the same, of means for operating one of said motors as a generator when the speed increases and as a motor when the speed decreases.

4. The combination with a main motor and an auxiliary motor, of means comprising said auxiliary motor for controlling the speed of said main motor when the same is operated at a low rate of speed.

5. The combination with a main motor, of means for controlling the speed of said main motor when operating at a low rate of speed, said means comprising an auxiliary motor mechanically connected to said main motor, and means for disconnecting said motors when the main motor operates at a high rate of speed.

6. The combination with a plurality of motors, and means for operatively connecting them, of means for operating one of said motors as a generator when their speeds exceed predetermined normal rates and as a motor when their speeds fall below said rates.

7. In a control system, the combination with a plurality of electric driving motors, and means for operatively connecting said motors, of a master switch for controlling the circuits of said motors and for controlling said connecting means, said switch operating to simultaneously complete the circuits of said motors and to effect their operative connection.

8. In a control system, the combination with a plurality of electric driving motors, means for operatively connecting said motors, and electro-responsive means in circuit with one of said motors for controlling said connecting means, of a master switch for simultaneously closing the circuits of said motors and for opening the circuit of said motor that is in circuit with said electro-responsive means.

9. In a control system, the combination with a plurality of electric driving motors, and means for operatively connecting said motors, of a master switch which operates successively to simultaneously complete the circuits of said motors and to effect their operative connection, break the circuit of one motor and disconnect said motors and accelerate a second motor.

In testimony whereof, I have hereunto subscribed my name this 28th day of July 1913.

HENRY D. JAMES.

Witnesses:
REED S. HAWK,
B. B. HINES.